United States Patent
Kuo et al.

(10) Patent No.: US 8,611,758 B2
(45) Date of Patent: *Dec. 17, 2013

(54) ARRAYS, SYSTEM AND METHOD FOR BI-DIRECTIONAL DATA TRANSMISSION

(75) Inventors: Huei Pei Kuo, Cupertino, CA (US); Robert G. Walmsley, Palo Alto, CA (US); Shih-Yuan Wang, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 220 days.

This patent is subject to a terminal disclaimer.

(21) Appl. No.: 12/991,107

(22) PCT Filed: May 7, 2008

(86) PCT No.: PCT/US2008/062953

§ 371 (c)(1),
(2), (4) Date: Nov. 4, 2010

(87) PCT Pub. No.: WO2009/136924
PCT Pub. Date: Nov. 12, 2009

(65) Prior Publication Data
US 2011/0058817 A1 Mar. 10, 2011

(51) Int. Cl.
*H04B 10/00* (2013.01)

(52) U.S. Cl.
USPC ........... 398/164; 398/118; 398/129; 398/131; 398/140; 398/156

(58) Field of Classification Search
None
See application file for complete search history.

(56) References Cited

U.S. PATENT DOCUMENTS

| | | | |
|---|---|---|---|
| 6,272,271 B1 | 8/2001 | Wojnarowski et al. | |
| 6,339,503 B1 * | 1/2002 | Derstine et al. | 359/622 |
| 6,509,992 B1 | 1/2003 | Goodwill | |
| 6,763,157 B1 | 7/2004 | Williams et al. | |
| 6,775,480 B1 * | 8/2004 | Goodwill | 398/158 |
| 7,217,911 B2 | 5/2007 | Edwards et al. | |
| 8,013,979 B2 * | 9/2011 | Ryzhikov et al. | 355/67 |
| 2001/0030782 A1 * | 10/2001 | Trezza | 359/110 |
| 2002/0003640 A1 * | 1/2002 | Trezza | 359/120 |
| 2006/0120731 A1 * | 6/2006 | Faska et al. | 398/202 |
| 2010/0296820 A1 * | 11/2010 | Kuo et al. | 398/201 |

FOREIGN PATENT DOCUMENTS

| | | |
|---|---|---|
| JP | 05-308327 | 11/1993 |
| JP | 09-044272 | 2/1997 |
| JP | 2002-353494 | 12/2002 |
| WO | WO-2009096927 | 8/2009 |
| WO | WO-2009123591 | 10/2009 |

OTHER PUBLICATIONS

Hewlett-Packard Dev, Co., LP., PCT Search Report, PCT/US2008/062953, Report dated Jan. 8, 2009.

* cited by examiner

*Primary Examiner* — Casey Kretzer

(57) ABSTRACT

A system for bi-directional data transmission includes a first array coupled to a first subsystem and a second array coupled to a second subsystem. The first array includes a first plurality of transmitters that produce first optical signals that are transmitted through free space, and a first plurality of receivers. The second array includes a second plurality of transmitters that produce second optical signals that are transmitted through free space to the first plurality of receivers, and a second plurality of receivers that is configured to receive the first optical signals. An image-forming apparatus is operatively positioned between the first and second arrays and is configured to concurrently form an image of the first plurality of transmitters on the second plurality of receivers and an image of the second plurality of transmitters on the first plurality of receivers.

14 Claims, 6 Drawing Sheets

ARRAYS, SYSTEM AND METHOD FOR BI-DIRECTIONAL DATA TRANSMISSION

BACKGROUND

The present disclosure relates generally to an array, a system and a method for bi-directional data transmission.

Many communication systems, such as server systems, are capable of high data rate signal transmission. In a server system using blades (e.g., server blades and storage blades), the blades may share system components, such as cooling fans, power sources, and enclosure management, all of which are mounted in an enclosed area. Such systems generally provide high data rate communication channels for communications between the blades. When such channels are available, the blades are able to work together and provide the desired data storage, processing, and communications.

In order to provide high data transmission rates, data channels utilize high frequency electrical signals. Such high frequency oscillations are subject to timing and amplitude noise during transmission, which result from imperfect control of impedance and propagation delays, as well as injection of noise from other sources. In addition, transmission of high frequencies through copper wires is inherently problematic, resulting in rapid signal attenuation per unit of transmission length. The use of optical signaling may circumvent many of these problems; however, guided optical signaling may include complex waveguides and/or loose optical cables or ribbons. Free-space optical signaling tends to reduce or eliminate impedance and noise problems associated with electrical signals, and also avoids the need for waveguides or optical cables. Generally the use of a free-space optical data channel requires precise alignment of an optical transmitter and an optical receiver in an environment that may experience mechanical vibrations and thermally driven motion/positional shifts.

BRIEF DESCRIPTION OF THE DRAWINGS

Features and advantages of embodiments of the present disclosure will become apparent by reference to the following detailed description and drawings, in which like reference numerals correspond to the same or similar, though perhaps not identical, components. For the sake of brevity, reference numerals having a previously described function may or may not be described in connection with subsequent drawings in which they appear.

DETAILED DESCRIPTION

Embodiments of the system and method disclosed herein advantageously include arrays with transmitters and receivers operatively integrated with a single chip. As such, a set of arrays, and corresponding image-forming apparatus(es), advantageously achieve bi-directional data flow within the system. In a particular set, all of the optical signals pass in parallel through the same focusing optical elements. As such, the image-forming apparatus is capable of forming an image of the transmitters of one array on the corresponding receivers of the other array. It is to be understood that data flows in both directions concurrently.

Furthermore, in some embodiments, the incorporation of a telecentric optical system advantageously avoids image distortion and provides tolerance that keeps the images of the transmitters on photosensitive areas of corresponding receivers/detectors for a range of separations and translational shift between the arrays. A dynamic alignment control system moves the optical elements to shift the image of the respective transmitters perpendicular to the optical axis to keep the communication channels aligned despite vibrations and thermally driven positional shifts that may be present in the environment in which the communication channels are maintained.

Figure 1:
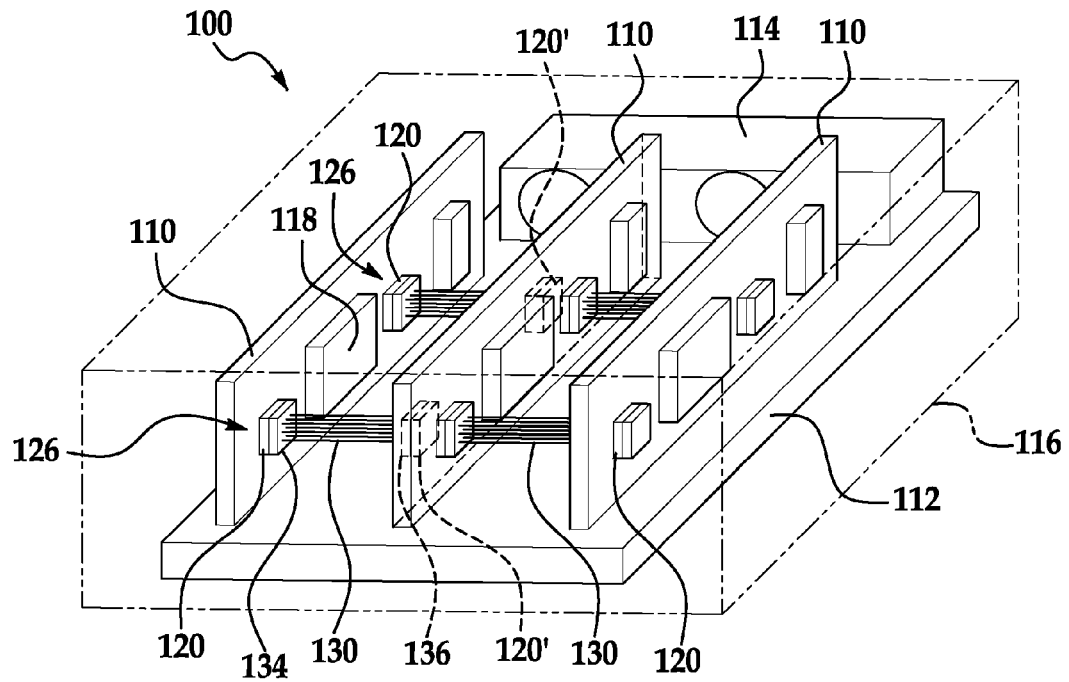
FIG. 1 is a semi-schematic perspective view of an embodiment of a server system.

Referring now to FIG. 1, an embodiment of the server system 100 is depicted. The server system 100 includes blades 110 that are mounted on a shared backplane 112. Additional components 114 (non-limiting examples of which include power supply transformers and cooling fans) may also be connected to the backplane 112. It is to be understood that the entire assembly may be contained in a shared enclosure 116 (shown in phantom). It is to be further understood that a user interface and sockets for external connections may be provided through the shared enclosure 116.

In one embodiment, the blades 110 in system 100 are substantially identical, and in another embodiment, one or more of the blades 110 is configured to perform different function(s). For example, some blades 110 may be server blades while others are storage blades. Each blade 110 includes one or more subsystems 118 that implement the particular function(s) of the blade 110. It is to be understood that the subsystems 118 may be mounted on one or both sides of each blade 110 using, for example, similar techniques used for mounting components on a printed circuit board. The subsystems 118 may also be positioned in the interior of the blade 110. Non-limiting examples of the subsystems 118 include hard drives or other data storage and processor subsystems containing conventional computer components (e.g., microprocessors, memory sockets, and integrated circuit memory).

As depicted in FIG. 1, each blade 110 includes one or more arrays 120, 120'. Each array 120, 120' includes a plurality of optical transmitters/emitters 122, 123 (shown in FIGS. 2A-2C and 4A-4B) and a plurality of optical receivers/detectors 124, 125 (shown in FIGS. 2A-2C and 4A-4B). A set 126 of arrays 120, 120' includes one of each array 120, 120' positioned such that the respective transmitters 122, 123 and receivers 124, 125 of each array 120, 120' face each other. Generally, a set 126 includes the two arrays 120, 120' on opposed surfaces of two adjacent blades 110. For example, the set 126 shown in FIG. 1 includes one array 120 positioned on a blade 110 such that the array 120 is nominally aligned with a corresponding array 120' on a neighboring blade 110 when the blades 110 are properly mounted on the backplane 112. It is to be understood that the two arrays 120, 120' in the respective sets 126 are positioned such that the transmitters 122, 123 of one array 120 can transmit signals to receivers 124, 125 on the other array 120', and vice versa.

The arrangement of the system 100 shown in FIG. 1 is a non-limiting example of such a system 100, and it is to be understood that other configurations are possible. For example, additional blades 110 and/or sets 126 may be incorporated.

In a non-limiting example, there may be about 5 cm of free space between corresponding arrays 120, 120' of a set 126. It is to be understood that one of the arrays 120, 120' in a set 126 may be subject to translational misalignment on the order of about 500 to 1000 µm and angular misalignment of up to about 1.5° tilt relative to the associated array 120', 120 due, at least in part, to variations in the mechanical mounting of the blades 110. Furthermore, the alignment of the arrays 120, 120' in a set 126 may be subject to variations on the order of 40 to 50 µm and up to 2° rotation due to fabrication tolerances, thermally driven positional shifts, and/or mechanical vibrations (e.g., resulting from the operation of cooling fans, hard drives, etc.).

Figure 2A:
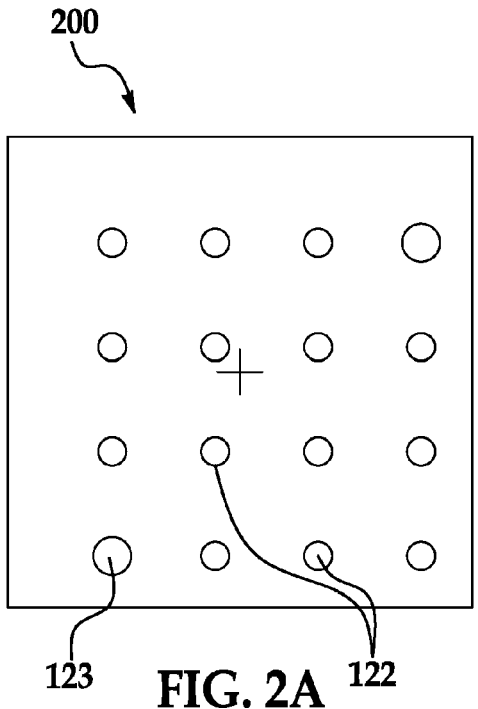
FIGS. 2A through 2C illustrate a layer of emitters, a layer of receivers/detectors, and an array incorporating such layers.
Figure 2B:
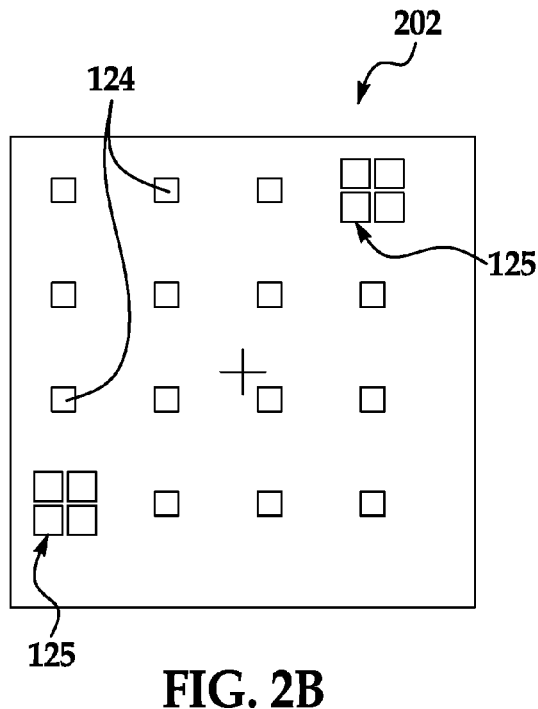
Figure 2C:
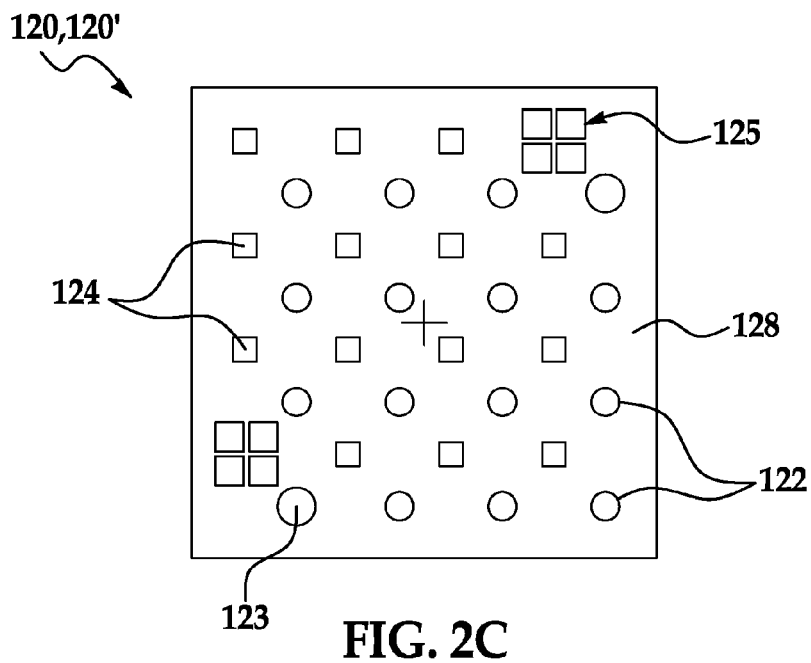

Referring now to FIGS. 2A through 2C, a sub-array or layer of transmitters 200, a sub-array or layer of detectors 202, and the integration of the sub-arrays/layers 200, 202 into a single array 120, 120' are respectively depicted. It is to be understood that FIG. 2C depicts the configuration/layout of the transmitters 122, 123 and detectors 124, 125 of one of the arrays 120, 120', and that the configuration/layout of the transmitters 122, 123 and detectors 124, 125 on the corresponding array 120', 120 in the set 126 depends, at least in part, on the layout of the first array 120, 120' and the optics selected.

The sub-array of transmitters 200 shown in FIG. 2A depicts a non-limiting example of a layout of the transmitters 122, 123. Transmitters 122 are data transmitters, and transmitters 123 are servo transmitters that are dedicated to providing position information. Non-limiting examples of transmitters 122, 123 include light sources or emitters, such as vertical cavity surface emitting lasers (VCSELs) or light emitting diodes (LEDs). The transmitters 122, 123 may be integrated into or on a substrate 128 (see FIG. 2C), such as, for example, an integrated circuit die. It is to be understood that each data transmitter 122 in each array 120, 120' is capable of emitting beam 130 (shown in FIG. 1) that can be modulated independently to encode data for transmission at a high data rate, e.g., about 10 Gb/s. It is to be further understood that each position information or servo transmitter 123 in each array 120, 120' is larger and slower than the data transmitters 122. Such servo transmitters 123 may or may not be modulated.

The sub-array of detectors 202 shown in FIG. 2B is a non-limiting example of a layout of the detectors 124, 125 that may be integrated with the sub-array of transmitters 200 to form an embodiment of the array 120, 120' (shown in FIG. 2C). Non-limiting examples of receivers 124, 125 include photodiodes. Such photodiodes each have a light sensitive area of a size selected according to the data rate of the signal received from a corresponding transmitter 122. For a data rate of 10 Gb/s or larger, the width of light sensitive area is generally less than about 40 µm across.

It is to be understood that the transmitters 122, 123 of sub-array/layer 200 and receivers 124, 125 of sub-array/layer 202 may be monolithically integrated with the substrate 128 or may be hybrid packaged using a silicon optical platform. When monolithic integration is used, VCSEL and photodiode layers 200, 202 are grown sequentially on a substrate 128, for example, on a GaAs wafer or on a Si/GaAs wafer. In one embodiment, the first set of layers 200 is the VCSELs and the second set of layers 202 is the photodiodes. The configuration of the transmitters 122, 123 and detectors 124, 125 are then defined using photolithography, where chemical and dry etching processes are used to expose the appropriate layers for connecting electrodes. When a silicon optical platform is used, pits are etched into the silicon wafer 128 where VCSELs and photodiodes may be attached with micron precision. Electrodes are preformed on the silicon optical platform and the VCSELs and photodiodes are solder bumped, wirebonded, or electroplated to the electrodes.

Generally, the layout of the detectors 124, 125 used in a single array 120, 120' may be identical to the layout of the transmitters 122, 123 for that same array 120, 120'; however, the layout of the detectors 124, 125 may be subjected to a rigid-body transformation in the plane of the configuration. Non-limiting examples of such a rigid-body transformation include translation of the receiver/detector layout with respect to the transmitter layout, rotation of the detector layout with respect to the transmitter layout, inversion (i.e., 180° rotation) of the detector layout with respect to the transmitter layout, mirror imaging of the detector layout with respect to the transmitter layout, or combinations thereof. In the embodiments shown in FIGS. 2A and 2B, the layout of the detectors 124, 125 of sub-array 202 is the layout of the transmitters 122, 123 of sub-array 200 inverted or rotated 180°.

Figure 3A:
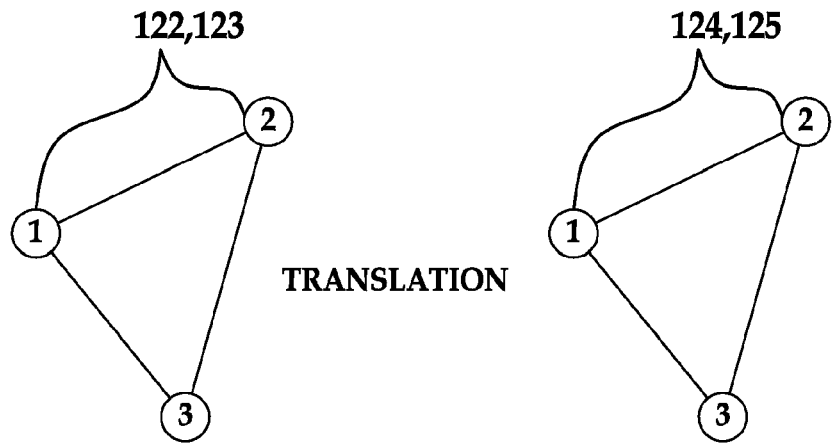
FIGS. 3A through 3C illustrate rigid-body transformation techniques used to form various embodiments of the array.
Figure 3B:
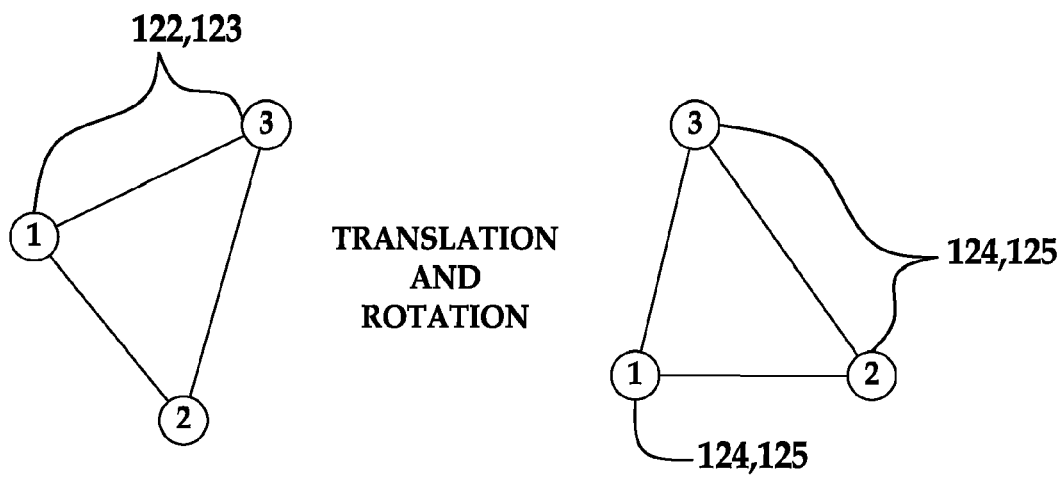
Figure 3C:
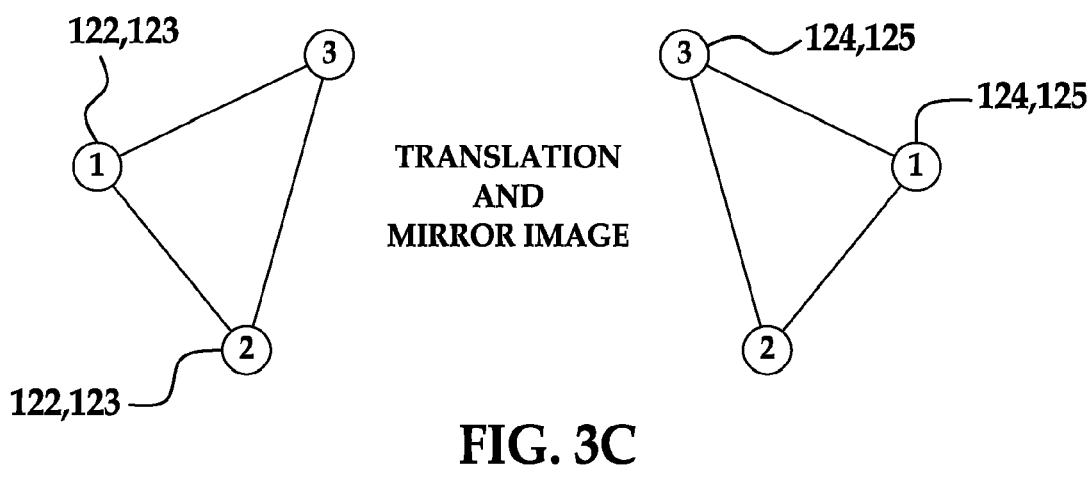

Other non-limiting examples of transmitter 122, 123 and detector 124, 125 layouts suitable for use in a single array 120, 120' are shown in FIGS. 3A through 3C. In each of these Figures, one or more rigid-body transformations is/are depicted. It is to be understood that in all of the rigid-body transformations disclosed herein, the relative positioning between the respective detectors 124, 125 remains unchanged, even though the layout of the detectors 124, 125 is moved or rotated with respect to the layout of the transmitters 122, 123. As such, the encircled numbers are a mapping of the transmitters 122, 123 and their corresponding receivers 124, 125 to the vertices of the triangles shown. The mapping is indicated by the numerical labels 1, 2 and 3 encircled at the vertices of the triangles. It is to be understood that corresponding transmitters 122, 123 and detectors 124, 125 are labeled with the same encircled number. As such, each encircled number has two instances in each of FIG. 3A, FIG. 3B, and FIG. 3C. The two instances in each figure represent a transmitter/detector pair. For example, in FIG. 3A, the transmitter 122, 123 at the vertex labeled "1" corresponds to the detector 124, 125 at the vertex labeled "1". FIG. 3A depicts translation of the detectors 124, 125 with respect to the transmitters 122, 123, FIG. 3B depicts translation and rotation of the detectors 124, 125 with respect to the transmitters 122, 123, and FIG. 3C depicts translation and mirror imaging of the detectors 124, 125 with respect to the transmitters 122, 123. As previously mentioned, the configuration/layout of the transmitters 122, 123 and detectors 124, 125 of FIGS. 3A, 3B and 3C are integrated on a single array 120, 120', and that the configuration/layout of the transmitters 122, 123 and detectors 124, 125 on a corresponding array 120', 120 depends, at least in part, on the layout of the first array 120, 120' and the optics selected between the arrays 120, 120'.

The image-forming apparatus (labeled 134 (shown in FIGS. 1, 4A, 4B, 5A-5D, 6 and 8) and 136 (shown in FIGS. 1, 5B-5D, 6 and 8)) between a set 126 of arrays 120, 120' are selected such that a desirable image is formed on each of the arrays 120, 120'. The image-forming apparatus 134, 136 selected may be inverting optics or non-inverting optics, depending, at least in part, on the configuration of the transmitters 122, 123 and detectors 124, 125 of the arrays 120, 120'. Non-inverting optics are optics with an odd number of intermediate images. In a non-limiting example, non-inverting optics may be used in a set 126 including arrays 120, 120' having the transmitter/detector layout shown in FIG. 4A, except that one of the arrays 120 or 120' is rotated 180°. Examples of inverting optics include Dove prisms or their analogs (non-limiting examples of which are described in PCT/US2008/004362, filed Apr. 2, 2008, incorporated herein by reference in its entirety). In a non-limiting example, inverting optics may be used in a set 126 including arrays 120, 120' having the same transmitter/detector layout.

Figure 4A:
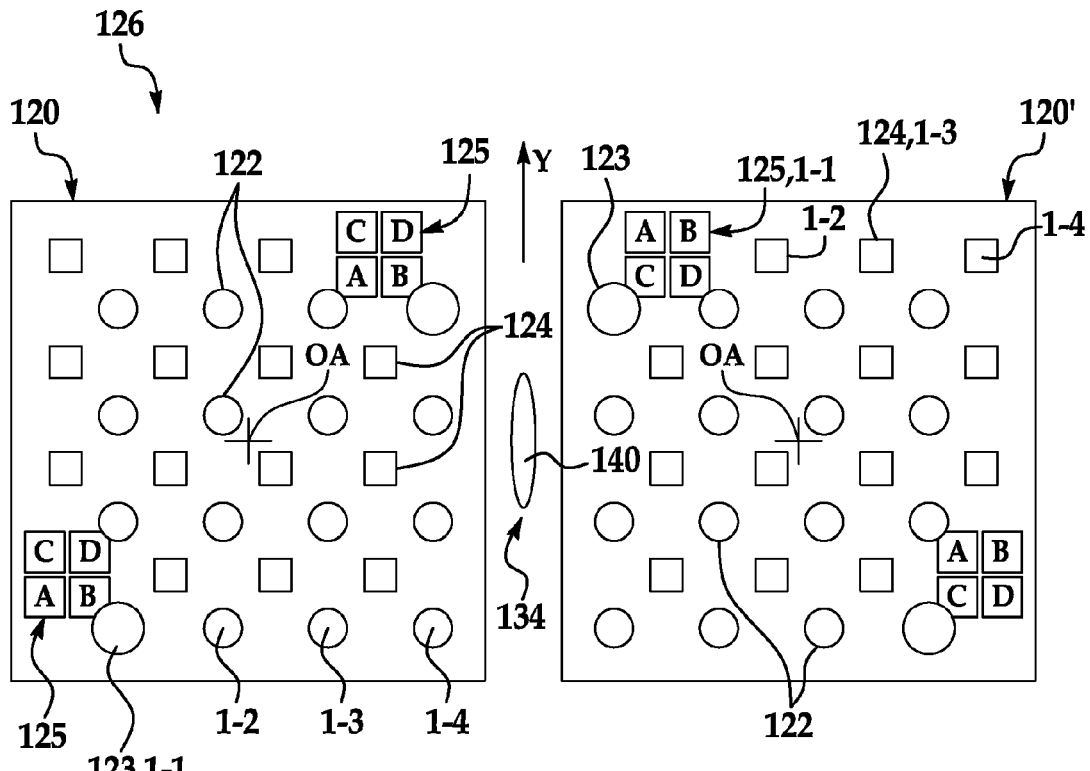
FIG. 4A is a schematic view of an embodiment of one set of arrays and the corresponding optics, where the surface of each array is depicted to illustrate the transmitters and receivers.

Referring now to FIG. 4A, a non-limiting example of a set 126 of arrays 120, 120' with a corresponding image-forming apparatus 134 positioned therebetween is depicted. While FIG. 4A illustrates a front view of each of the arrays 120, 120', it is to be understood that in the system 100, the transmitters 122, 123 and receivers 124, 125 of the respective arrays 120, 120' face each other.

In this embodiment, the corresponding arrays 120, 120' are mirror images of one another about the Y-axis, and the optical axis OA coincides with a center of each array 120, 120' and a center of the image-forming apparatus 134.

In the embodiment shown in FIG. 4A, the image-forming apparatus 134 includes a single lens 140 positioned between the arrays 120, 120'. In this embodiment, the configuration of the transmitter/detector layouts requires inverting optics. As such, the lens 140 is configured to invert the respective optical signals from transmitters 122, 123 across to corresponding receivers 124, 125. It is to be understood that the photons pass through the same space substantially without interference. Some of the transmitters 122, 123 and receivers 124, 125 of FIG. 4A are further labeled to illustrate which transmitters 122, 123 correspond with which receivers 124, 125. For example, transmitters 1-1, 1-2, 1-3, and 1-4 of array 120 transmit signals which are received by receivers 1-1, 1-2, 1-3, 1-4 of array 120'. The mapping of each transmitter 123, 124 and corresponding receiver 124, 125 is illustrated in FIG. 4B (discussed in further detail hereinbelow).

As depicted in FIG. 4A, each array 120, 120' may include one or more position/location detectors 125 used in combination with the servo transmitters 123 for alignment. Each position/location detector 125 may include four photodiodes with photosensitive areas or quadrants A, B, C, D. For the alignment process, a servo transmitter 123 of one array 120 is paired with one position/location detector 125 of the other array 120' and emits a relatively wide cross-section beam intended to be respectively centered on the corresponding detector 125. As a non-limiting example, in FIG. 4A, transmitter 123, 1-1 of array 120 is configured to emit such a beam to detector 125, 1-1 of array 120'. It is to be understood that servo transmitters 123 and position/location detectors 125 may be located on either array 120, 120' or both on one array 120, 120'. Utilizing two pairs of servo transmitters 123 and position detectors 125 located as an opposed pair on either array 120, 120', relative X, Y and rotational alignment (rotation around the optical axis) may be determined. Compensation for rotational misalignment greater than about 1.5 degrees would generally require an additional image rotation component. Misalignment of the arrays 120, 120' may be determined from the ratios of the optical power or intensity received in the quadrants A, B, C, and D of the respective detectors 125. As a non-limiting example, desirable alignment may correspond to a configuration where each of the four quadrants A, B, C, and D of the respective detectors 125 receives the same amount of power. Furthermore, a servo control system is capable of detecting when an array 120, 120' is in rotational alignment (i.e., when the ratios of power received in all quadrants A, B, C, and D of both detectors 125 are equal), and thus is also capable of detecting when the formed image needs to be shifted (i.e., when the power received in the four quadrants A, B, C, and D of any detector 125 are not equal).

Figure 4B:
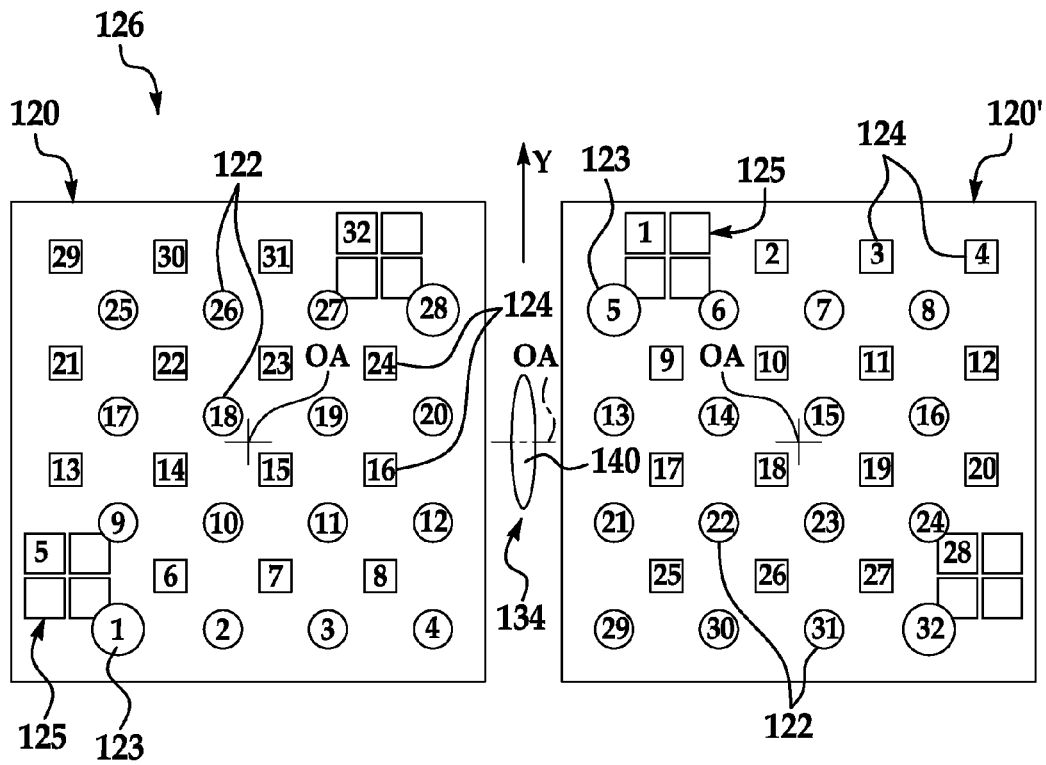
FIG. 4B is a schematic view of the embodiment shown in FIG. 2A including numerical labels illustrating the mapping of transmitters to corresponding receivers as a result of the transformation applied by the optics.

Referring now to FIG. 4B, a complete mapping of the transmitters 122, 123 and their corresponding receivers 124, 125 of the embodiment of FIG. 4A is depicted. The mapping is indicated by the numerical labels 1-32. It is to be understood that corresponding transmitters 122, 123 and detectors 124, 125 are labeled with the same number. Transmitters 122, 123 and receivers 124, 125 with the same number form a single channel pair. In the non-limiting example shown in FIG. 4B, there are 32 channel pairs, 16 transmitting signals in each direction. These respective channels are divided into 28 data channels and 4 servo/position channels. It is to be understood that more channels may be added by reducing the distance between transmitters 122, 123 and receivers 124, 125 in the array (pitch) 120, 120' or by increasing the size of the array 120, 120', which is limited by the optical imaging system 100 in which it is to be included. It is to be further understood that 4 servo/position channels or fewer are desirable regardless of the total channel count.

It is to be understood that one array 120' is generally scaled with respect to the other array 120, where the scaling factor is equal to the magnification of the image forming apparatus 134, 136. As such, the spacing between the elements (i.e., transmitters 122, 123 and detectors 124, 125) in one of the arrays 120 may be equal to or different than the spacing between the elements of the corresponding array 120', depending, at least in part, on the magnification of the image-forming apparatus 134, 136. For example, when the magnification of the image-forming apparatus 134, 136 is equal to 1, the spacing of the elements on the respective arrays 120, 120' is equivalent. Generally, the spacing of the elements on the corresponding array 120' is equal to "M" times the spacing between the elements on the array 120, where M=optical magnification.

In one embodiment, the system 100 includes a single image-forming apparatus 134 positioned between arrays 120, 120' of a set 126. As depicted in FIGS. 4A and 4B, the image-forming apparatus 134 includes a single lens 140 positioned and configured to transmit therethrough one or more optical signals emitted from both arrays 120, 120' of a set 126. In this embodiment, the image-forming apparatus 134 is dynamic and includes a mounting that is capable of moving the optical elements so that the direction or position of beams 130 from transmitters 122, 123 of the arrays 120, 120' may be adjusted.

The image-forming apparatus 134 may be used in conjunction with mirrors and/or other image-forming systems (e.g., image-forming apparatus 136 shown, for example, in FIGS. 1 and 6-8) to achieve the desirable images. FIGS. 5A through 5D depict respective examples of sets 126 of arrays 120, 120' and corresponding image-forming apparatuses 134, 136.

Figure 5A:
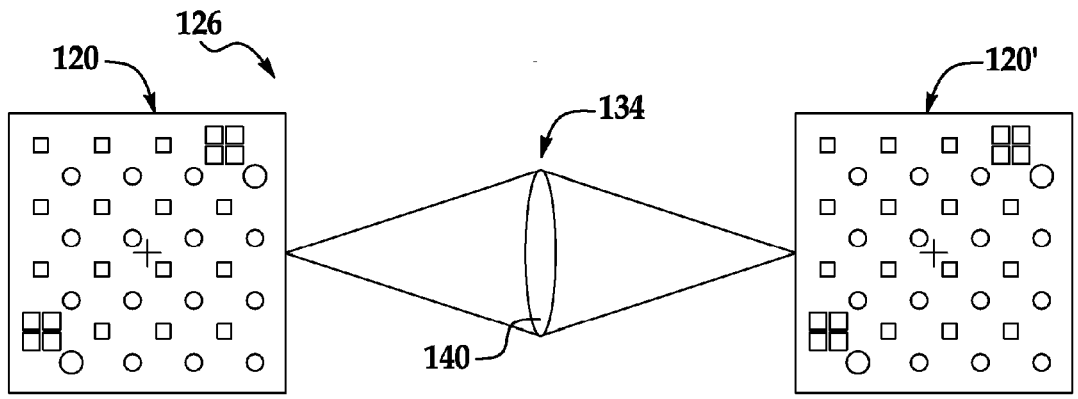
FIGS. 5A through 5D depict respective examples of arrays and corresponding optics, where the surface of each array is depicted to illustrate the transmitters and receivers.
Figure 5B:
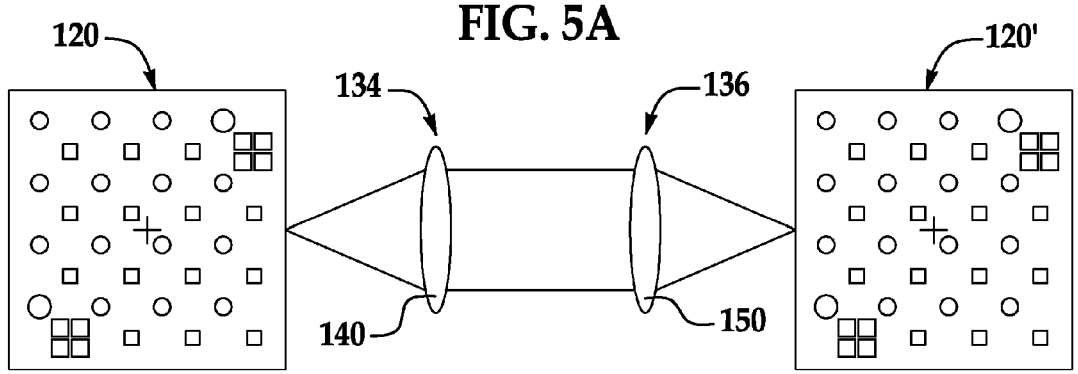

FIG. 5A depicts a relatively simple set 126 with a single lens 140 as the image-forming apparatus 134 and arrays 120, 120' having the same transmitter/detector layout. FIG. 5B also depicts a relatively simple set 126 with two image-forming apparatuses 134, 136, each of which includes a lens 140, 150. The lenses 140, 150 are non-inverting, and thus the arrays 120, 120' have the same transmitter/detector layout.

Figure 5C:
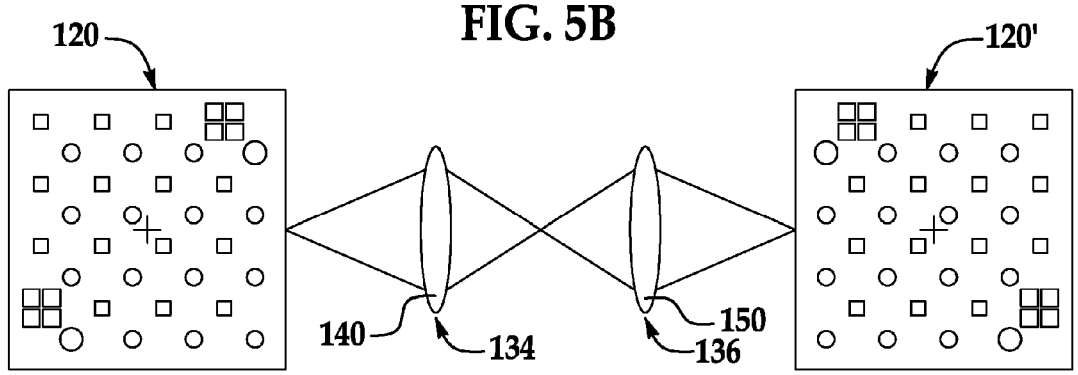

FIG. 5C depicts a set 126 of arrays 120, 120' in which one array 120' is a mirror image of the other array 120 (similar to the embodiment of the arrays 120, 120' shown in FIGS. 4A and 4B). Relay lenses 140, 150 invert the respective images.

Figure 5D:
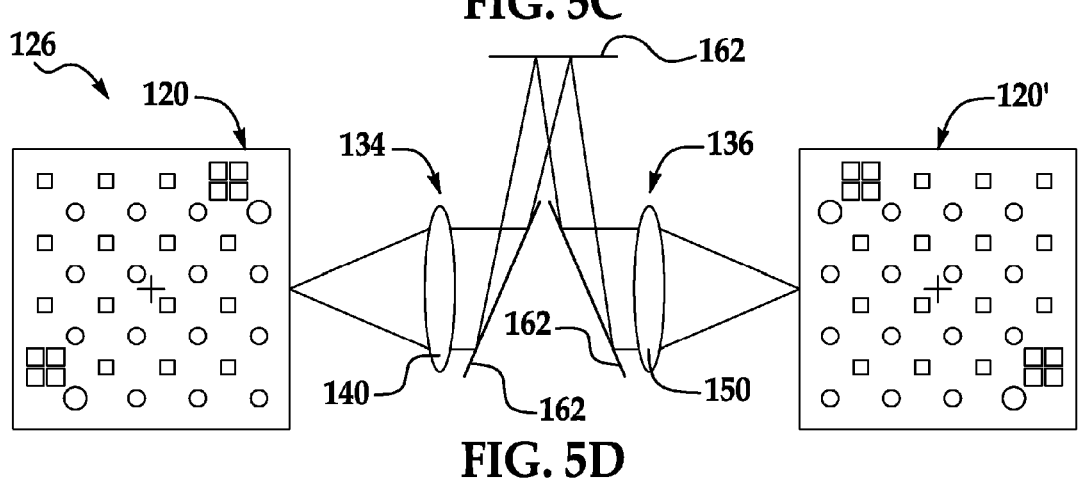

FIG. 5D depicts a non-limiting example in which mirrors 162 are used in conjunction with the image-forming apparatuses 134, 136. It is to be understood that an odd number of mirrors 162 will create a mirror image of the respective transmitted signals. As such, a set 126 of arrays 120, 120' in which one array 120' is a mirror image of the other array 120 is used in this embodiment.

Referring back to FIG. 1 and as previously described, two image-forming apparatuses 134, 136 may be used. As shown in FIG. 1, the image-forming apparatus 134 may be positioned adjacent to the array 120 and the other image-forming apparatus 136 may be positioned adjacent to the array 120'. It is to be understood that, in this embodiment, at least some of the optical elements in each apparatus 134, 136 form a portion of a telecentric lens that is shared by all the optical signals transmitted between the arrays 120, 120'. Each of the image-forming apparatuses 134, 136 is dynamic and includes one or more mountings capable of moving the optical elements so that the direction or position of beams 130 from transmitters 122, 123 of the arrays 120, 120' may be adjusted.

Since signal transmission is bi-directional, it is to be understood that the telecentric lens is both image side and object side telecentric, and forms an image on the receivers 124, 125 of the array 120, 120' that are configured for receiving optical signals. The telecentricity provided by a pair of apparatuses 134, 136 in this embodiment renders the optical communication channels between the arrays 120, 120' tolerant of variations in the separation between the arrays 120, 120', i.e., tolerant to movement along the optical axis of the telecentric lens.

Control systems in image-forming apparatus 134 and/or image-forming apparatus 136 are operated to adjust the positions of one or more optical elements associated with the apparatuses 134, 136. It is to be understood that any established communications established between blades 110 may be used to coordinate dynamic operation of image-forming apparatuses 134, 136, for example, to transmit alignment data from the array 120, 120' acting as the receiver to a servo control system for the corresponding image-forming apparatus 134, 136. It is to be further understood that alignment data may be carried on a lower data rate electrical channel, or as part of the data on any optical channel between blades 110.

Figure 6:
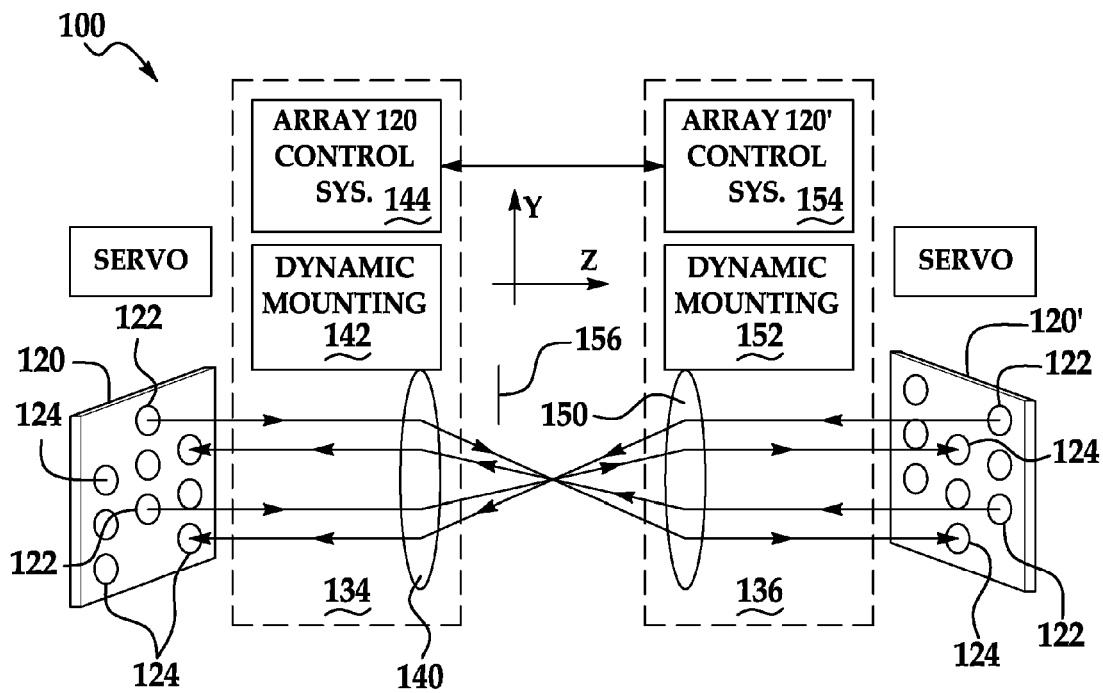
FIG. 6 is a schematic and partially perspective view of an embodiment of the server system.

FIG. 6 illustrates some components of the system 100 of FIG. 1. As depicted, the system 100 shown in FIG. 6 includes the arrays 120, 120', each of which is associated with its respective image-forming apparatus 134, 136. In this embodiment, the image-forming apparatus 134 includes the lens 140 held in an active/dynamic mounting 142. Dynamic mounting 142 is controlled by a control system 144, which determines how to move the lens 140 during operation of the optical data channels. Likewise, the other image-forming apparatus 136 includes a lens 150 held in an active/dynamic mounting 152. Dynamic mounting 152 is controlled by a control system 154, which determines how to move the lens 150 associated therewith. When the arrays 120, 120' are rotationally aligned, control systems 144, 154 move the various optical elements 140, 150 to maintain alignment for optical communications. It is to be understood that each lens 142, 152 has 2 degrees of freedom of motion.

In the embodiment shown in FIG. 6, the image-forming apparatuses 134, 136 work together as a telecentric lens that forms an image of the data transmitters 122 (of one array 120, 120') in the plane of the corresponding receivers 124 (of the other array 120', 120). With proper alignment and image-forming apparatus 134, 136, the transmitters 122 of one array 120, 120' are imaged on the corresponding array 120', 120 so that light sources 122 that are transmitting optical signals coincide with detectors 124 in the array 120, 120' configured to receive such signals. FIG. 6 illustrates an example where the pattern of detectors 124 in the respective arrays 120, 120' is inverted relative to the pattern of light sources 122 in the corresponding respective arrays 120', 120 because the combined image-forming apparatuses 134, 136 invert the images of the respective arrays 120', 120.

It is to be understood that the size and magnification of the transmitted image does not change significantly with the separation between arrays 120, 120', at least in part because the combined optical system is double telecentric. Accordingly, if vibrations or thermal changes cause one of the arrays 120, 120' to move in the Z direction in FIG. 6, the size of the transmitted image does not change. Furthermore, a telecentric system with unity magnification is substantially free of many types of distortion, such as, for example, field distortion. As a result, the size and spacing of illuminated areas remains constant, and multiple channels will remain aligned as long as the center of the respective images remains centered on center of the respective receiving array 120, 120'. It is believed that the absence or reduction of coma or other distortion reduces cross-talk caused by light from one optical signal leaking into the detector for another optical signal. To further decrease noise or cross-talk, an aperture 156 may be inserted between image-forming apparatuses 134, 136, such as, for example, where the focusing effects of image-forming apparatus 134 cause the optical signals to cross. Additional apertures (not shown) could also or alternatively be provided respectively around the detectors 124, 125 in the respective arrays 120, 120'.

Still further, stray light and cross-talk may further be reduced by conditioning a surface of one or both of the arrays 120, 120' in a set 126 to absorb offset emission from the respective transmitters 122, 123.

Mountings 142, 152 move one or more of the optical elements 140, 150 to align the respective optical axes of the arrays 120, 120'. In an embodiment, the mounting(s) 142, 152 include mechanical structures that are capable of shifting and/or tilting lens 140, 150 in a plane substantially perpendicular to the optical axis of the system, e.g., in an X-Y plane in FIG. 6.

Figure 7A:
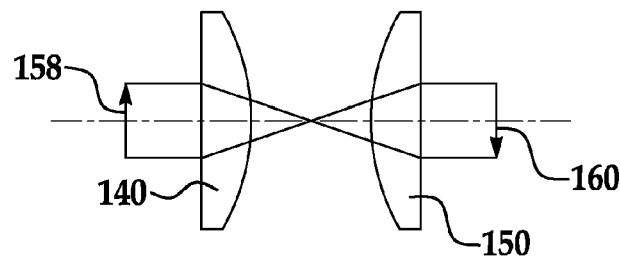
FIGS. 7A through 7C illustrate different examples of how an image is moved when lenses are moved or misaligned.
Figure 7B:
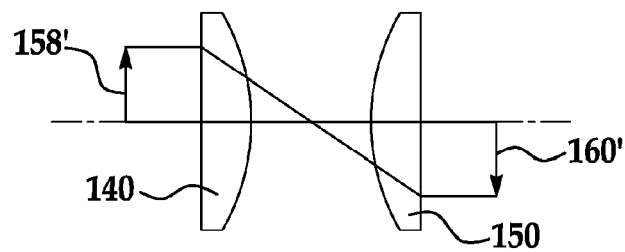
Figure 7C:
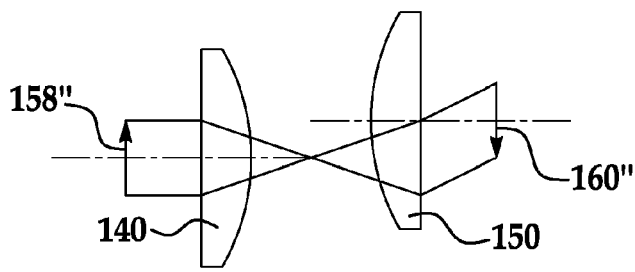

FIGS. 7A, 7B, and 7C illustrate how shifting one or both of the lenses 140, 150 shifts the location of the transmitted image. FIG. 7A illustrates a configuration where the lenses 140, 150 have a shared optical axis that passes through the center of an object 158. An image 160 formed by the combination of lenses 140, 150 is also centered on the shared optical axis of lenses 140, 150. When the lenses 140, 150 are translated perpendicular to their optical axes, the image 158 is translated perpendicular to the separation between the lenses 140, 150. As a non-limiting example, as shown in FIG. 7B, both lenses 140, 150 are shifted downward an equal amount so that their optical axes remain aligned, but pass along a bottom edge of the object 158'. The resulting image 160' is shifted downward relative to the image 160 shown in FIG. 7A. As such, if the object 158 is offset by an amount, $\Delta o$, from the optical axis of lenses 140, 150, the image 160 is shifted by a corresponding distance $\Delta i = M \Delta o$, where M is the magnification of the image-forming apparatus, including lenses 140, 150. The telecentric system minimizes image distortion when such shifts occur, in part because the chief rays from object 158 are normal to the image plane.

FIG. 7C illustrates the effect of one component lens 140 being off axis from the other lens 150. The relative offset of the component lenses 140, 150 shifts an image 160" in the X-Y plane relative to the object 158". It is to be understood that this effect may be used to correct alignment of the image 158" with the location of the receivers 124 in the array 120, 120' used for receiving transmitted optical signals. For example, if angular misalignment of the transmitters 122 and receivers 124 causes the image 160 (FIG. 7A) to be offset from the array 120, 120', the lenses 140, 150 can be shifted relative to the array 120, 120' to shift the image 160 into the desirable aligned position.

It is to be understood that servo mechanisms may also be employed in the embodiments disclosed herein. The control systems 144, 154 may employ closed loop servo control to electronically measure and correct any misalignment. In one embodiment, the optical power received in the communication channels or in separate alignment channels may be monitored to determine whether the system 100 is misaligned and whether correction is required.

Figure 8:
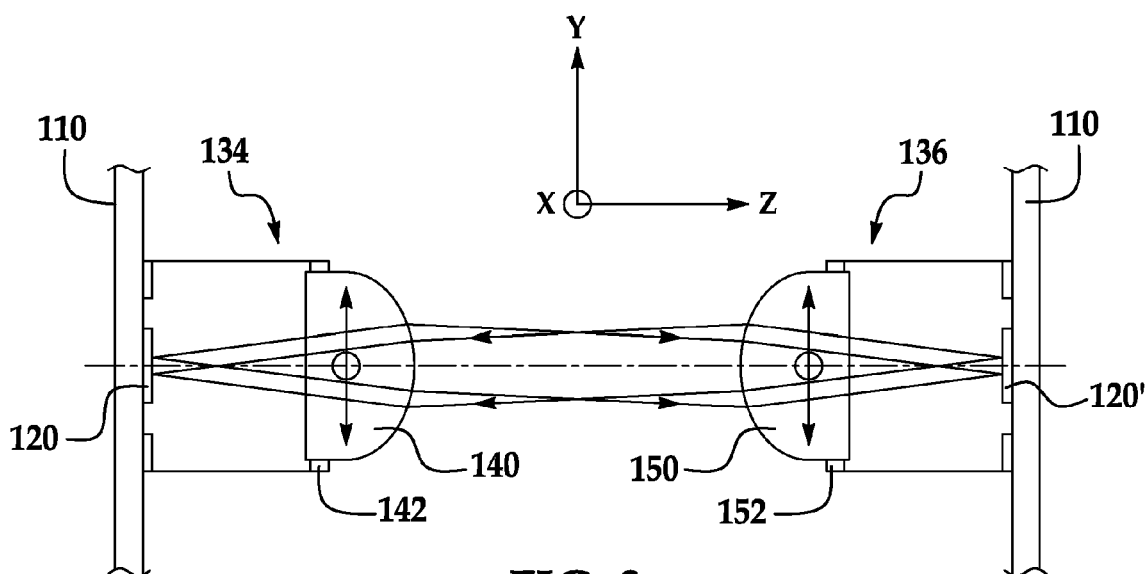
FIG. 8 is a schematic view of an embodiment of bi-directional data flow between a set of arrays and optics.

FIG. 8 depicts the bi-directional data flow between one set 126 of arrays 120, 120' and corresponding image-forming apparatuses 134, 136.

While several embodiments have been described in detail, it will be apparent to those skilled in the art that the disclosed embodiments may be modified. Therefore, the foregoing description is to be considered exemplary rather than limiting.

What is claimed is:

1. A system for bi-directional data transmission, comprising:
   a first array coupled to a first subsystem, the first array including i) a first plurality of transmitters that produce first optical signals that are transmitted through free space, and ii) a first plurality of receivers;
   a second array coupled to a second subsystem, the second array including i) a second plurality of transmitters that produce second optical signals that are transmitted through free space to the first plurality of receivers, and ii) a second plurality of receivers that is configured to receive the first optical signals; and
   an image-forming apparatus operatively positioned between the first and second arrays and configured to concurrently form an image of the first plurality of transmitters on the second plurality of receivers and an image of the second plurality of transmitters on the first plurality of receivers wherein:
      the image-forming apparatus is a telecentric lens consisting of a first lens and a second lens, the first lens being operatively connected to the first subsystem, and the second lens being operatively connected to the second subsystem;
      the first and second lenses are independently and controllably configured to enable the concurrent bi-directional transmission; and
      the telecentric lens is both image side and object side telecentric.

2. The system as defined in claim 1, further comprising:
   a first mounting system attaching the first lens to the first subsystem;
   a second mounting system attaching the second lens to the second subsystem; and
   a closed-loop control system that operates at least one of the first mounting system or the second mounting system to dynamically move the attached lens and maintain a bi-directional link of the first and second optical signals.

3. The system as defined in claim 2 wherein each of the first array and the second array further comprises a servo detector used in the close-loop control system.

4. The system as defined in claim 1 wherein the first array is a mirror image of the second array, and wherein the image-forming apparatus is capable of inverting the first and second plurality of optical signals.

5. The system as defined in claim 1 wherein a layout of the first plurality of receivers is identical to a layout of the first plurality of transmitters, wherein the layout of the first plurality of receivers is at least one of translated, rotated, inverted, or mirror imaged with respect to the layout of the first plurality of transmitters, and wherein the first plurality of transmitters and the first plurality of receivers are superimposed to form the first array.

6. The system as defined in claim 5 wherein the second array is a mirror image of the first array.

7. The system as defined in claim 1 wherein the second array is scaled with respect to the first array, and wherein a scaling factor is equal to a magnification of the image-forming apparatus.

8. The system as defined in claim 1 wherein each of the first array and the second array includes a respective integrated circuit die, wherein the first plurality of transmitters and the second plurality of transmitters each includes VCSELs fabricated in the respective integrated circuit die, and wherein the first plurality of receivers and the second plurality of receivers each includes photodiodes contained in the respective integrated circuit die.

9. The system as defined in claim 1 wherein a surface of at least one of the first array or the second array unoccupied by the respective first and second plurality of transmitters or the respective first and second plurality of receivers is conditioned to absorb offset emission from the respective first and second plurality of transmitters, thereby reducing stray light and cross-talk between the arrays.

10. The system as defined in claim 1 wherein the image-forming apparatus is selected from a non-inverting lens and an inverting lens.

11. The system as defined in claim 1 wherein the first lens is a single element lens and the second lens is a single element lens.

12. The system as defined in claim 11 wherein the first lens and the second lens are the only refracting lenses operative on the image of the first plurality of transmitters on the second plurality of receivers and the image of the second plurality of transmitters on the first plurality of receivers.

13. A method for transmitting data between a first subsystem and a second subsystem, the method comprising:
   modulating at least some of i) a first plurality of optical signals using a first array in the first subsystem and ii) a second plurality of optical signals using a second array in the second subsystem;
   concurrently and independently transmitting i) the first plurality of optical signals from transmitters of the first array through an image-forming apparatus and free space located between the first and second subsystems to receivers of the second array, thereby forming an image of the first plurality of transmitters on the second array, and ii) the second plurality of optical signals from transmitters of the second array through the image-forming apparatus and free space located between the first and second subsystems to receivers of the first array, thereby forming an image of the second plurality of transmitters on the first array; and
   controlling at least one optical element in the image-forming apparatus to align the respective images wherein:

the image-forming apparatus is a telecentric lens consisting of a first lens and a second lens, the first lens being operatively connected to the first subsystem, and the second lens being operatively connected to the second subsystem;

the at least one optical element is at least one of the first lens and the second lens; and the telecentric lens is both image side and object side telecentric.

14. The method as defined in claim 13 wherein controlling the at least one optical element includes at least one of moving a lens in a direction substantially perpendicular to its optical axis or tilting the lens.

* * * * *